United States Patent
Sugiyama et al.

(10) Patent No.: US 6,349,944 B1
(45) Date of Patent: Feb. 26, 2002

(54) SEALING STRUCTURE

(75) Inventors: Izumi Sugiyama; Toshiyuki Satou; Masayasu Sakata, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,340

(22) Filed: Feb. 18, 2000

(30) Foreign Application Priority Data

Feb. 22, 1999 (JP) ............................................ 11-043529

(51) Int. Cl.⁷ ................................................ F02F 11/00
(52) U.S. Cl. ...................... 277/591; 277/592; 277/598
(58) Field of Search ................................ 277/591, 592, 277/594, 598

(56) References Cited

U.S. PATENT DOCUMENTS

| | | | |
|---|---|---|---|
| 3,840,239 A | * | 10/1974 | Fazekas et al. |
| 4,677,730 A | * | 7/1987 | Mineo et al. |
| 4,807,892 A | * | 2/1989 | Udagawa |
| 4,832,349 A | * | 5/1989 | Kawai et al. |
| 5,122,214 A | * | 6/1992 | Zurfluh et al. |
| 5,275,420 A | * | 1/1994 | Rodenkirch |
| 5,727,791 A | * | 3/1998 | Weiss et al. |
| 6,056,296 A | * | 5/2000 | Ii |

FOREIGN PATENT DOCUMENTS

JP          5-34385          8/1993

* cited by examiner

*Primary Examiner*—Anthony Knight
*Assistant Examiner*—Vishal Patel
(74) *Attorney, Agent, or Firm*—Armstrong, Westerman & Hattori, LLP

(57) ABSTRACT

A plate-shaped gasket 23 is inserted between a plurality of parts with an edge of the plate-shaped gasket 23 offset such that portions of mutually joining surfaces of the plurality of parts to be joined to each other (a cylinder block 1 and a cylinder head 4, as well as a chain cover 22 and a sprocket casing portion 20 in the embodiment) directly oppose each other, and a liquid gasket 29 is filled in a gap G formed by the directly opposing portions of the plurality of parts and the offset edge (an inner peripheral edge of a chain accommodating hole 27) of the plate-shaped gasket. As a result, since the thickness of the liquid gasket can be determined by the thickness of the plate-shaped gasket, it becomes unnecessary to form a recessed portion for storing the liquid gasket by machining, so that the number of manufacturing steps is prevented from increasing.

6 Claims, 3 Drawing Sheets

SEALING STRUCTURE

BACKGROUND OF THE INVENTION

1. Field of the Invention

The present invention relates to a sealing structure between a plurality of parts which are joined together, and more particularly to a sealing structure using a liquid gasket.

2. Description of the Related Art

There are cases where a liquid gasket composed of uncured synthetic rubber is used to secure air-tightness and liquid-tightness between two parts which are joined together, such as a cylinder block and an oil pan or a cylinder head. In a case where this liquid gasket is used in a portion to which large pressure is applied or a portion which undergoes large thermal deformation, if its thickness is excessively small, the liquid gasket is incapable of following the displacement between the two parts, making it impossible to obtain satisfactory sealing properties in some cases.

As a countermeasure against such a problem, a structure is known in which a recessed portion for inserting and fitting the liquid gasket is formed on the joining surfaces of the two parts (refer to Japanese Utility Model Examined Publication Hei.5-34385).

However, a further reduction in the manufacturing cost is generally desired for mass-produced items, so that the structure which requires machining for forming the recessed portion is not preferable since the reduction in the number of manufacturing steps is difficult, as described in the aforementioned publication;

SUMMARY OF THE INVENTION

The invention has been devised to overcome the above-described problems of the related art, and its main object is to provide a sealing structure which is improved to make it possible to secure sealing properties of a liquid gasket without increasing the number of manufacturing steps.

To attain the above object, according to the present invention, a plate-shaped gasket 23 is inserted between a plurality of parts with an edge (an inner peripheral edge of a chain accommodating hole 27 in the embodiment) of the plate-shaped gasket uneven such that portions of mutual joining surfaces of the plurality of parts to be joined to each other (a cylinder block 1 and a cylinder head, as well as a chain cover 22 and a sprocket casing portion 20 in the embodiment) directly oppose each other, and a liquid gasket 29 is filled in a gap G formed by the directly opposing portions of the plurality of parts and the uneven edge of the plate-shaped gasket.

According to this arrangement, since the thickness of the liquid gasket can be determined by the thickness of the plate-shaped gasket, and the region of application of the liquid gasket can be determined by the edge of the plate-shaped gasket, the amount of application of the liquid gasket can be minimized, and the operating efficiency improves. Further, the liquid gasket is made difficult to be subject to effects (heat, water, etc.) from the outside, and this arrangement is advantageous in improvement of the durability of the liquid gasket. In addition, since it becomes unnecessary to form a recessed portion for storing the liquid gasket by machining, the number of manufacturing steps is prevented from increasing.

Further, the invention described above is applied to the mutual joining surfaces of the plurality of parts which are joined together to form a first space portion (a space S1 in a chain accommodating hole in the embodiment) and a second space portion (a space S2 in a cylinder, that is, a space S2 as a combustion chamber in the embodiment) held under pressure higher than that of the first space portion. Specifically, a plate-shaped gasket is inserted between the plurality of parts with an edge of the plate-shaped gasket uneven on a first space portion side such that outer peripheral portions in the first space portion directly oppose each other; outer peripheral portions of mutual joining surfaces of the plurality of parts in the second space portion are opposed to each other in a state in which a bead portion 23a formed on the plate-shaped gasket is interposed therebetween; and a liquid gasket is filled in a gap formed by the directly opposing outer peripheral portions of the plurality of parts in the first space portion and the offset edge of the plate-shaped gasket.

According to this arrangement, since it is unnecessary to form a bead portion in the first space portion on the low pressure side, the structure of the gasket does not become complex. Moreover, it is possible to stabilize the sealing properties of the second space portion on the high pressure side, and it suffices if openings corresponding to the first space portion and the second space portion are formed in a common plate-shaped gasket, so that the number of parts of the plate-shaped gasket is prevented from increasing.

DETAILED DESCRIPTION OF THE PREFERRED EMBODIMENTS

Referring now to the accompanying drawings, a detailed description will be given of the configuration of the invention.

Figure 1:
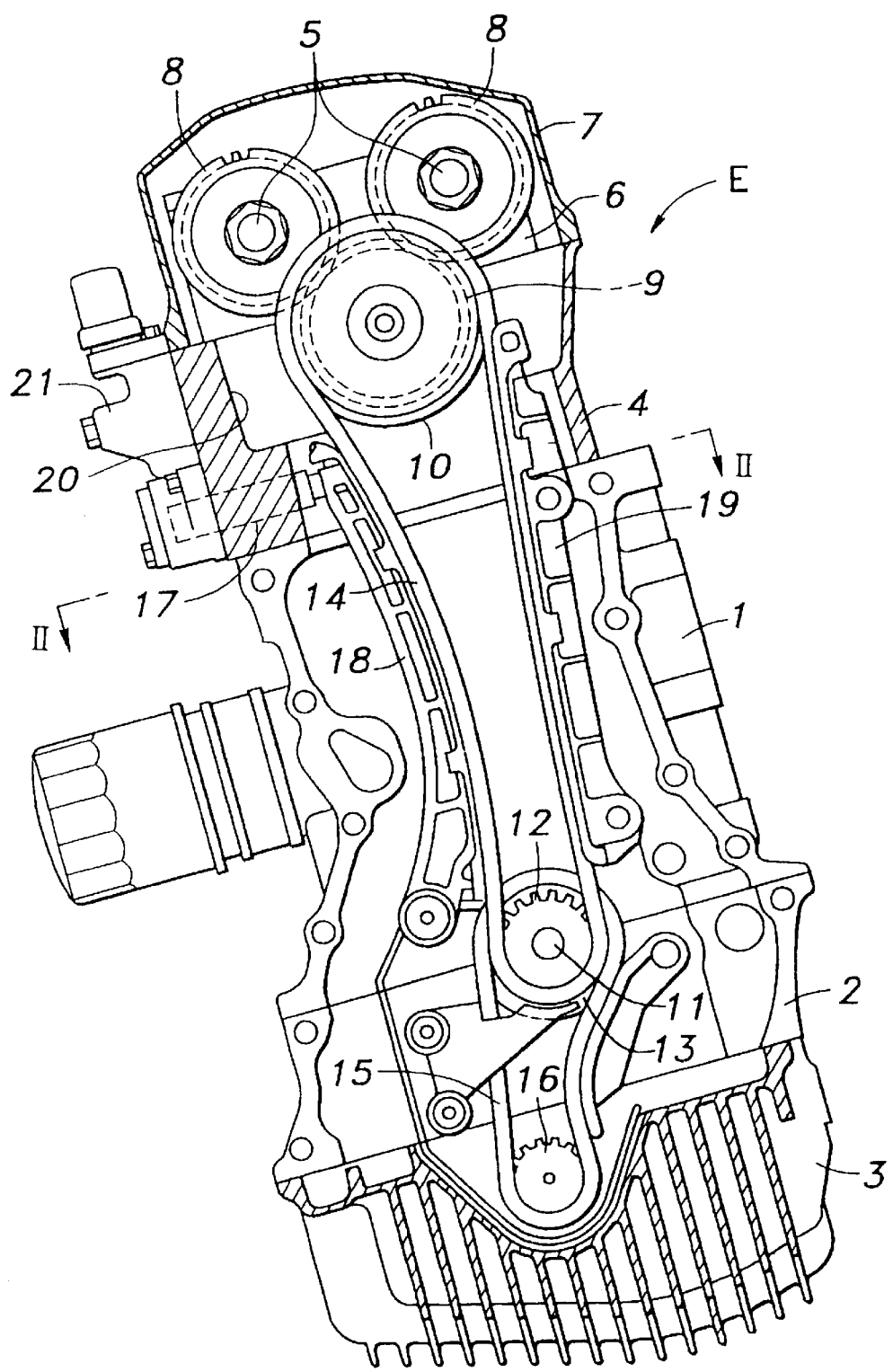
FIG. 1 is an elevational view, partly cut in section, illustrating the crank pulley side of an in-line multicylinder engine to which the invention is applied.

FIG. 1 is an elevational view, partly cut in section, illustrating the crank pulley side of an in-line multicylinder engine to which the invention is applied. This engine E includes a cylinder block 1 in which a plurality of cylinders are disposed in a series; a bearing cap block 2 joined to the lower surface of the cylinder block 1; an oil pan 3 joined to the lower surface of the bearing cap block 2; and a cylinder head 4 joined to the upper surface of the cylinder block 1. A cam holder 6 which pivotally supports two camshafts 5 is disposed on top of the cylinder head 4. These camshafts 5 are covered with a head cover 7 joined to the upper surface of the cylinder head 4.

Cam gears 8 are fitted to respective ends of the two camshafts 5. These cam gears 8 mesh with a common idle gear 9 pivotally secured on the crank pulley-side end face of the cylinder head 4. In addition, a driven sprocket 10 for a camshaft is integrally joined to the idle gear 9.

In the same way as a known engine, a crankshaft 11 is supported by a main bearing at the joined surfaces of the cylinder block 1 and the bearing cap block 2.

A drive sprocket 12 for a camshaft and a drive sprocket 13 for an oil pump are fitted to the crankshaft 11. These drive sprockets 12 and 13 are respectively connected to the driven sprocket 10 for the camshaft and a driven sprocket 16 for an oil pump by means of separate silent chains 14 and 15. As a result, an oil pump (not shown) is driven at the same time as the camshaft 5 integral with the cam gear 8 is driven by the crankshaft 11 through the idle gear 9 integral with the driven sprocket 10 for the camshaft.

For the silent chain 14 wound around and extending between the driven sprocket 10 for the camshaft and the drive sprocket 12 for the camshaft, a tensioner shoe 18 which is pressed by the thrust of a hydraulic plunger unit 17 is provided on the left-hand side in FIG. 1, while a guide shoe 19 for preventing swaying is provided on the right-hand side in FIG. 1. As a result, the tension of the silent chain 14 for driving the camshaft is automatically adjusted to become constant at all times, and it is ensured that the silent chain 14 does not sway excessively.

A sprocket casing portion 20 for accommodating the idle gear 9, the driven sprocket 10 for the camshaft, and a portion of the silent chain 14 wound around the sprocket is formed integrally at the crank pulley-side end portion of the cylinder head 4. A hydraulic control valve 21 for effecting on-off control of oil pressure to a valve-actuated-state adjustable apparatus (not shown) is, together with the hydraulic plunger unit 17, mounted on the left-hand surface in the drawing of the sprocket casing portion 20.

An upper end of a chain cover 22 (see FIGS. 2 and 3) joined to the crank pulley-side end face of the cylinder block 1 is joined to the lower surface of the sprocket casing portion 20.

Figure 2:
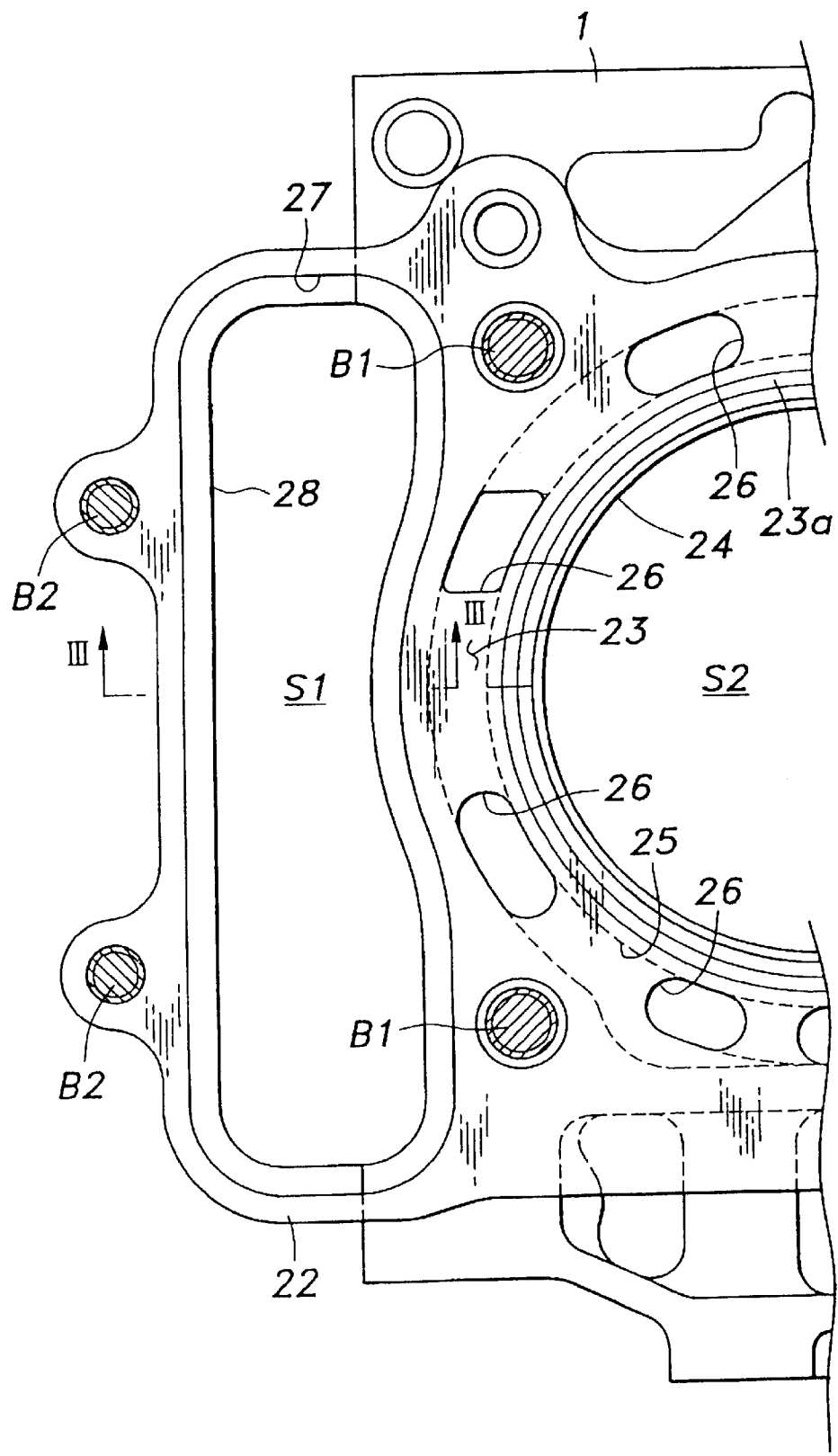
FIG. 2 is a partial plan view taken along line II—II in FIG. 1.

FIG. 2 shows the upper surface of the cylinder block 1, i.e., the surface to be joined to the cylinder head 4. A plurality of (in this embodiment, three) plate-shaped gaskets 23 are inserted between the upper surface of this cylinder block 1 and the lower surface of the cylinder head 4. These plate-shaped gaskets 23 are mainly used to seal the junction between the cylinder block 1 and the cylinder head 4 which is formed in such a manner as to extend from a combustion chamber to the interior of a cylinder 24 from the high combustion pressure acting in a second space S2. Bead portions 23a are formed at a position surrounding the periphery of the cylinder 24. Namely, the portions of the cylinder block 1 and the cylinder head 4 surrounding the second space S2 oppose each other via the bead portions 23a formed in the plate-shaped gaskets 23. In addition, a plurality of holes 26 for allowing a water jacket 25 on the cylinder block 1 side and a water jacket (not shown) on the cylinder head 4 side to communicate with each other are formed in the plate-shaped gaskets 23 at appropriate intervals on a common circumference surrounding the peripheries of the bead portions 23a.

The contour of the sprocket casing portion 20 formed integrally with the cylinder head 4 approximately corresponds to the contour of the upper end faces of the cylinder block 1 and the chain cover 22 in a mutually joined state, i.e., the contour shown in FIG. 2.

Figure 3:
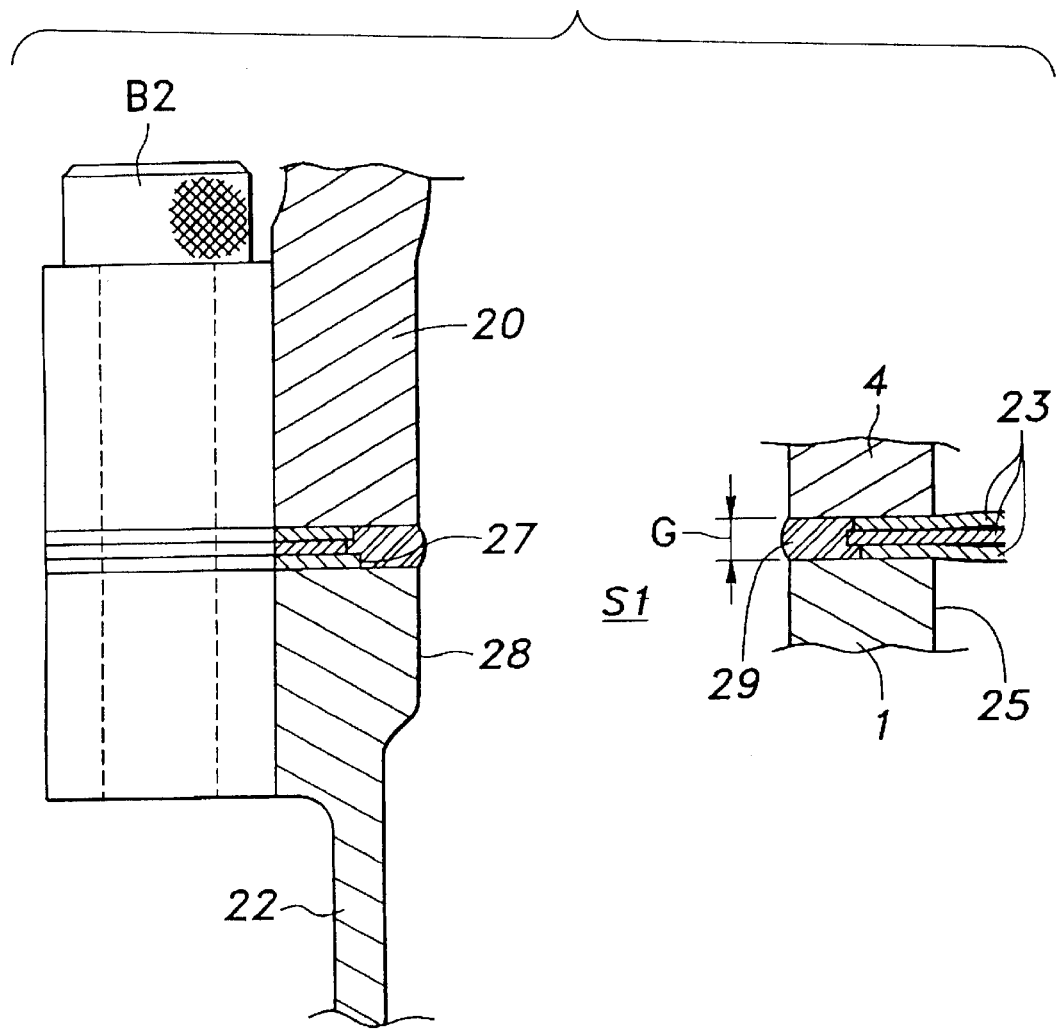
FIG. 3 is a partial vertical cross-sectional view taken along line III—III in FIG. 2.
Figure 4:
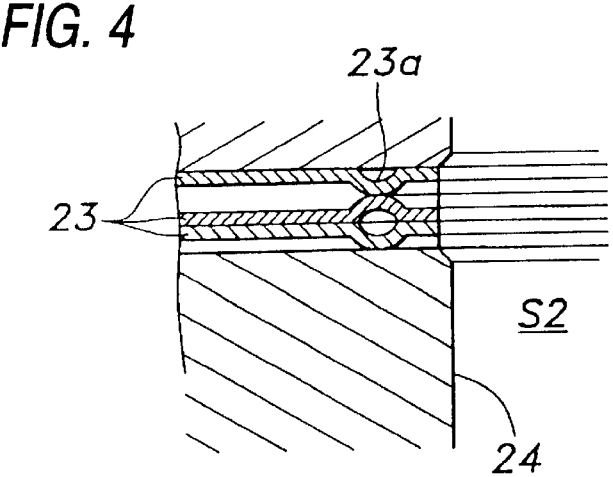
FIG. 4 is an enlarged cross-sectional view of an essential portion.

The plate-shaped gaskets 23 are clamped between the cylinder block 1 and the cylinder head 4 with the tightening force of bolts B1 for fixing the cylinder head 4 to the cylinder block 1 and bolts B2 for joining the lower surface of the sprocket casing portion 20 to the upper end face of the chain cover 22 (see FIG. 3). Here, particularly in the portion surrounding the second space S2, the three plate-shaped gaskets 23 are laminated such that projecting portions of the bead portions 23a oppose each other and recessed portions thereof oppose each other (see FIG. 4).

Together with the aforementioned portion for sealing the junction between the cylinder block 1 and the cylinder head 4 at the periphery of the second space S2 by means of the bead portions 23a, a portion surrounding a first space S1 for accommodating the silent chain 14, i.e., a chain accommodating hole 27, is formed by the plate-shaped gaskets 23. The inner peripheral contour of this chain accommodating hole 27 is slightly larger than the inner peripheral contour of a chain accommodating hole 28 which is formed jointly by the cylinder block 1 and the chain cover 22. That is, the inner peripheral edge of the chain accommodating hole 27 in the plate-shaped gaskets 23 is offset radially outwardly from the inner peripheral edge of the chain accommodating hole 28 formed jointly by the cylinder block 1 and the chain case 22, and is clamped between the cylinder head 4 and the cylinder block 1 and between the sprocket casing portion 20 of the cylinder head 4 and the chain cover 22. For this reason, the portions of the sprocket casing portion 20 of the cylinder head 4 and each of the cylinder block 1 and the chain case 22 surrounding the first space S1 directly oppose each other. The arrangement is provided such that a gap G corresponding to the thickness of the plate-shaped gaskets 23 after bolting is formed in this directly opposing portion.

If a liquid gasket 29 is filled between the directly opposing portions of the sprocket casing portion 20 and each of the cylinder block 1 and the chain cover 22 and the inner peripheral edge of the chain accommodating hole 27 at the plate-shaped gaskets 23, and the bolts B1 and B2 are then tightened, the gap G serves as a recessed portion for retaining the liquid gasket 29. At the same time, if there are variations in dimension among the chain accommodating holes 27 at the three laminated plate-shaped gaskets 23, the positions of the inner peripheral edges of the chain accommodating holes 27 become non-uniform, but since their portions contacting with the liquid gasket 29 become irregular due to this arrangement, the effect of retaining the liquid gasket 29 is enhanced. Further, since the liquid gasket 29 enters into the space between the overlapping portions of the three plate-shaped gaskets 23, the effect of retaining the liquid gasket 29 can be further enhanced.

As described above, since the thickness of the liquid gasket can be determined by the thickness of the plate-shaped gasket, and the region of application of the liquid gasket can be determined by the edge of the plate-shaped gasket, the amount of application of the liquid gasket can be minimized, and the operating efficiency improves. Further, the liquid gasket is made difficult to be subject to effects (heat, water, etc.) from the outside, and this arrangement is advantageous in improvement of the durability of the liquid gasket. In addition, since it becomes unnecessary to form a recessed portion for storing the liquid gasket by machining, the number of manufacturing steps is prevented from increasing.

Further, since it is unnecessary to form a bead portion in the first space portion on the low pressure side, the structure of the gasket does not become complex. Moreover, it is possible to stabilize the sealing properties of the second space portion on the high pressure side, and it suffices if openings corresponding to the first space portion and the second space portion are formed in a common plate-shaped gasket, so that the number of parts of the plate-shaped gasket is prevented from increasing.

While only certain embodiments of the invention have been specifically described herein, it will apparent that numerous modification may be made thereto without departing from the spirit and scope of the invention.

The present disclosure relates to the subject matter contained in Japanese Patent Application No. Hei. 11-43529 filed on Feb. 22, 1999 which is expressly incorporated herein by reference in its entirety.

What is claimed is:

1. A structure for sealing a plurality of parts which are joined together to form a first space portion as a chain accommodating hole and a second space portion as a combustion chamber held under pressure higher than that of said first space portion, comprising:

a plate-shaped gasket inserted between said plurality of parts such that outer peripheral portions of mutual joining surfaces of said plurality of parts, which are adjacent to said first space portion, are directly opposed to each other, said plate-shaped gasket so inserted having an uneven edge at a side of said first space portion, said plate-shaped gasket having a bead portion interposed between outer peripheral portions of mutual joining surfaces of said plurality of parts, which are adjacent to said second space portion; and a liquid gasket filled in a gap formed by the directly opposing portions of said plurality of parts in the outer peripheral portion of said first space portion and said uneven edge of said plate-shaped gasket, said gap serving as a recessed portion for retaining the liquid gasket without any recess formed in the directly opposing portions of said plurality of parts.

2. A structure according to claim 1, wherein said plate-shaped gasket comprises a plurality of plate-shaped gaskets laminated with each other.

3. A structure according to claim 2, wherein said edges of said plurality of plate-shaped gaskets at a filling side of said liquid gasket are positioned non-uniformly with each other.

4. A structure according to claim 1, wherein said plate-shaped gasket comprises three plate-shaped gaskets laminated with each other.

5. A structure according to claim 4, wherein said edges of said three plate-shaped gaskets at a filling side of said liquid gasket are positioned non-uniformly with each other.

6. The structure according to claim 1, wherein said plate-shaped gasket is integrally formed at a portion surrounding said first space portion and said second space portion, said gap is defined at an inner peripheral edge of said second space portion at a side of said first space portion, and said liquid gasket is filled in said gap.

* * * * *